Figure 1:
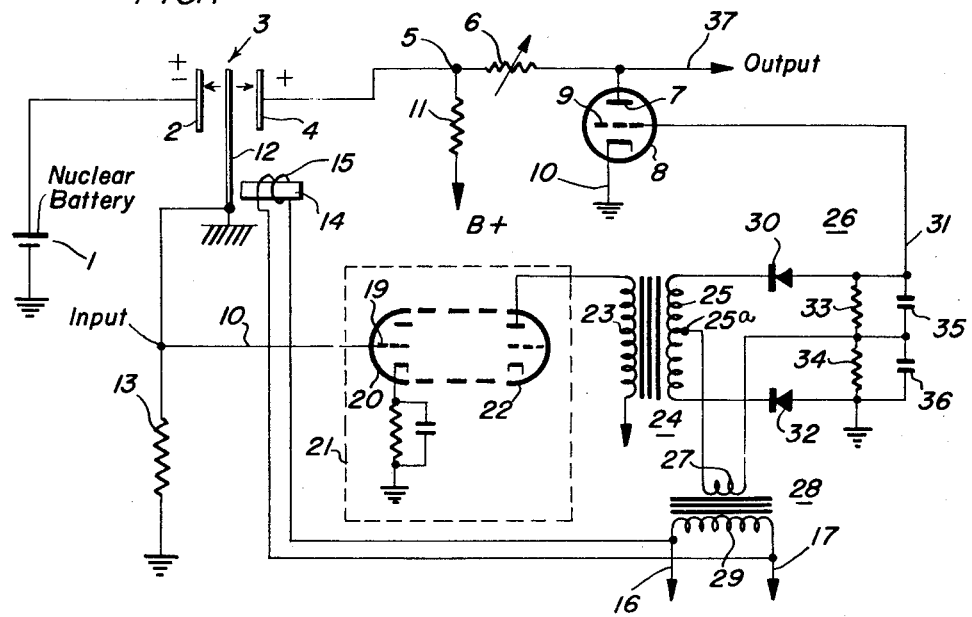

Sept. 18, 1962   J. H. SEARCY ET AL   3,054,942
AUTOMATIC VOLTAGE REGULATOR
Filed Sept. 12, 1957

INVENTORS.
JOHN H. SEARCY
HANS SCHARLA-NIELSEN

BY *Hurvitz & Rose*

ATTORNEYS

United States Patent Office 3,054,942
Patented Sept. 18, 1962

3,054,942
AUTOMATIC VOLTAGE REGULATOR
John H. Searcy, Indialantic, and Hans Scharla-Nielsen, Melbourne, Fla., assignors to Radiation, Inc., Melbourne, Fla., a corporation of Florida
Filed Sept. 12, 1957, Ser. No. 683,581
8 Claims. (Cl. 323—15)

The present invention relates generally to automatic voltage regulators and more particularly to an automatic voltage regulator employing a standard voltage cell as a source of reference potential.

It is a broad object of the present invention to provide a novel system of voltage regulation.

It is another broad object of the present invention to provide a novel system of voltage regulation employing a standard voltage cell.

It is a further object of the present invention to provide a voltage regulating system employing a standard voltage cell, wherein although the cell is continuously connected in a voltage measuring circuit, the current drain on the standard cell is minimal.

It is another object of the present invention to provide a comparison type voltage regulator wherein a regulated output voltage may be varied over relatively wide range.

It is another object of the present invention to provide a voltage regulating circuit wherein a source of voltage to be regulated is connected in circuit with a standard source of voltage so as to establish an electric field proportional to the difference between the standard voltage and the regulated voltage, wherein a measuring and control circuit is employed for measuring the voltage gradient of the electric field and for varying the regulated voltage so as to minimize the gradient of the electric field.

It is another object of the present invention to connect a standard source of voltage and a source of voltage to be controlled in series with a capacitor so that an electrostatic field is established across the capacitor which is indicative of the defference between the voltage of the standard source and the voltage to be controlled, and further to employ a measuring and control circuit for measuring the gradient and sense of the electro-static field and for controlling the voltage of the source to be controlled so as to diminish the electro-static field across the capacitor.

Briefly describing the apparatus of the present invention in its broad aspects, a standard source of voltage is connected between a source of reference potential such as ground and one plate of a capacitor and a variable source of voltage to be controlled is connected between ground and a second plate of the capacitor, the sources being poled so that the two plates of the capacitor are substantially at the same potential with respect to ground. If the two plates of the capacitor are at the same potential, indicating that the voltage to be controlled is at a desired value, then no electro-static field is developed across the capacitor. In the event, however, that the voltage to be controlled and the voltage of the standard source are different, an electro-static field is established across the capacitor, which field may be measured by appropriate means to be described. Measurement of the electro-static field produces a voltage having a magnitude and sense determined by the gradient and sense of the field across the capacitor and this voltage may be employed to vary the voltage of the variable source so as to diminish the voltage across the capacitor.

It can be seen from the above that although the cell is continuously connected in circuit, the drain on the cell is maintained quite small since the only current drain is that required to charge the capacitor when the voltage of the regulated source falls below the voltage of the standard source. By maintaining the response time of the system quite small and by employing stable elements in the control and supply circuits, the deviation of the regulated source may be retained within safe limits and the drain on the standard cell may be maintained at an exceedingly low level.

In the first embodiment of the present invention, the standard source and source to be controlled, are connected to opposite plates of an air capacitor and a vibrating reed is disposed between the two plates of the air capacitor and connected to ground through a resistor. The reed forms a distinct capacitor with each of the plates and if movement of the reed is quite small the variations of the two capacities with movement of the reed are equal and opposite. In consequence, if the voltages on the two plates of the capacitor are equal, the variation of charge across the two capacitors, with movement of the reed, are equal and opposite and there is no net current flow through the resistor connected in circuit with the reed. If the voltages on the two plates of the air capacitor are different, the voltage across the two capacitors, formed between the reed and the two plates, is different and corresponding changes in the capacities due to the movement of the reed produce unequal variations in charge across the capacitors. Consequently, the currents flowing through the resistor are unequal and result in a net voltage which may be employed in a control circuit to correct the voltage of the variable source.

In a second embodiment of the invention, the standard source of voltage and the variable source to be controlled are connected in series with a capacitor having a dielectric material exhibiting ferro-electric properties. A material exhibiting ferro-electric properties is one in which the dielectric constant of the material varies with the voltage applied thereacross, and if a voltage having a sinusoidal or other cyclic waveform is applied across the capacitor, its dielectric constant is varied cyclically in phase with the sinusoidal voltage. In the second embodiment of the present invention an additional set of capacitor plates are provided to which is connected a source of periodically varying voltage which cycles the dielectric material of the capacitor through predetermined variations in its dielectric constant. In the event that the voltage of the variable source and of the standard source are equal, variations of the dielectric properties of the capacitor has no effect upon the circuit. However, upon deviation of the voltage of the variable source from that of the standard source, an electro-static field having a predetermined gradient is established across the capacitor and variation of the dielectric constant of the dielectric material of the capacitor produces alternate charging and dischargining of the capacitor, the magnitude of the varying charge depending upon the gradient of the electro-static field due to the voltage difference between the two sources. Thus, by measuring the current flow through an impedance connected in series with the capacitor an error signal is developed which may be employed by to control the voltage of the variable source.

It will be noted that in both embodiments of the present invention, the voltage gradient across a capacitor connected in series with the two sources of voltage is varied to produce a current flow indicative of the variation of electrostatic field, which in itself is indicative of the disparity between the voltages of the variable source and the standard source.

A number of standard cells are commercially available which may be employed in the apparatus of the present invention, one example of which is a nuclear battery. The nuclear battery, which is a recent development in the art, provides a very stable voltage so long as the current drain on the battery is maintained at an extremely low level. By appropriately choosing the circuit elements and components and values of the various impedances employed in the circuits of the present invention, the charging current for the measuring capacity of the apparatus may be maintained at a low level to minimize the drain on the standard cell, thereby making the system appropriate for use with a nuclear battery.

It is, therefore, another object of the present invention to provide a voltage regulator in which the nuclear battery may be employed as a standard source since drain on the battery is minimized by the system of the invention.

It is another object of the present invention to provide a voltage control circuit wherein a nuclear battery and a variable source of voltage are connected in opposition across a measuring capacity, the capacity of which is varied to produce a current flow indicative of the differences between the two voltages.

Figure 2:
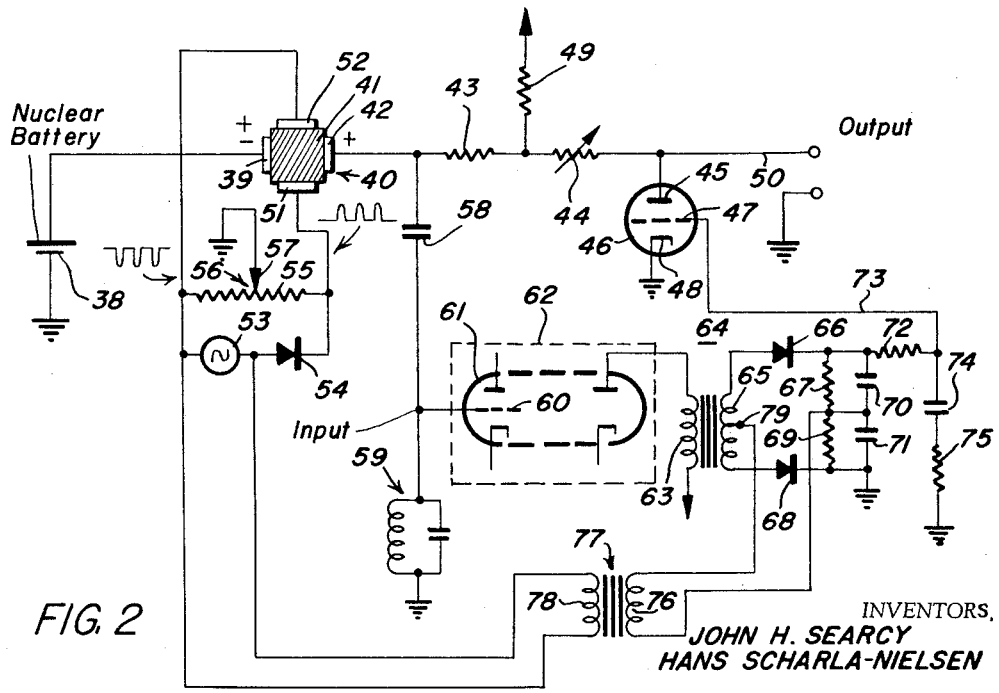

The above and still further objects, features and advantages of the present invention will become apparent upon consideration of the following detailed description of two specific embodiments thereof, especially when taken in conjuction with the accompanying drawings, wherein:

FIGURE 1 is a circuit diagram of the first embodiment of the present invention; and FIGURE 2 is a schematic diagram of a second embodiment of the present invention.

Referring specifically to FIGURE 1 of the accompanying drawings, a nuclear battery 1 has its negative terminal connected to a source of reference potential, such as ground, and has its positive terminal connected to a conductive member 2 forming one plate of an air capacitor 3, having a second plate 4. The plate 4 is connected via a lead 5 and variable resistor 6 to anode 7 of an electron tube 8 having a grid 9 and a cathode 10. The lead 5 is further connected to a source of anode potential through a resistor 11.

A small vibratile metallic reed 12 is disposed equidistant between the plates 2 and 4 of the air capacitor and is mechanically supported on the chassis of the instrument. The reed 12 is electrically connected through a resistor 13 to ground and is vibrated by means of polarized electromagnet 14, having a coil 15 connected across power line conductors 16 and 17, transversely to the equi-potential lines of the electro-static field established between the plates 2 and 4 of the air capacitor 3. The ungrounded end of the resistor 13, that is, the end of the resistor 13 connected to the reed 12, is connected via a lead 10 to grid 19 of an electron tube 20 constituting the input amplifier stage of a cascaded A.C. amplifier 21. The output stage of the amplifier 21 comprises an electron tube 22 having a primary winding 23 of a transformer 24 connected in its anode circuit. A secondary winding 25 of the transformer 24 constitutes a first source of input voltage to a phase-sensitive detector 26 having a second input voltage developed across a secondary winding 27 of a transformer 28 having a primary winding 29 connected across the leads 16 and 17. The upper end of the secondary winding 25, as viewed in FIGURE 1, is connected through a diode 30 to lead 31, while the lower end of the winding 25 is connected through a diode 32 to ground, the diodes 30 and 32 being similarly poled with respect to winding 25. Connected between the lead 31 and ground are series connected resistors 33 and 34 shunted by capacitors 35 and 36 respectively. This secondary winding 27 of the transformer 28 is connected between a mid point 25a on the winding 25 and the junction of the resistors 33 and 34. The output lead 31 from the phase sensitive detector 26 is connected to the control grid 9 of the electron tube 8.

The output voltage from the system appears on a lead 37 connected directly to the anode 7 of the tube 8 and the magnitude of the voltage appearing on this lead may be varied at will by means of the variable resistor 6. Specifically, the resistors 6 and 11 and the tube 8 constitute a variable voltage divider with the voltage appearing on the lead 37 bearing a predetermined relation to the voltage appearing on the lead 5 as determined by the relative impedance of the resistor 6 and the tube 8.

The system, as will appear subsequently, maintains the voltage on the plate 4 and, therefore, the lead 5 at a constant value and since the resistor 11 has a fixed value, the system must draw a constant current. The requirement for a constant current through resistor 11 also requires that the combined resistance of the resistor 6 and the tube 8 be constant and, therefore, if the value of resistor 6 is varied, there must take place an equal but opposite variation of the impedance of tube 8, since the lead 37 is connected between the resistor 6 and the tube 8 and the system is a constant current system. The voltage on lead 37 is determined by the ratio of the impedance of resistor 6 and the tube 8 and this voltage may be varied at will by varying the value of resistor 6. The operation of the system of the present invention in maintaining the voltage on plate 4 at the same magnitude as the voltage on plate 2 of capacitor 3 relies upon a determination of the gradient and sense of the electro-static field between the plates 2 and 4. With the voltage on the plates 2 and 4 equal to one another, and, therefore, the voltage on the lead 37 equal to the desired value, equal but oppositely directed electro-static fields are set up between vibrating reed 12 and the plates 2 and 4 respectively. So long as the motion of the reed 12 is small compared with the distance between the plates 2 and 4, the variation of voltage gradient between the reed 12 and the plates 2 and 4 respectively, may be considered to be equal and opposite so that the variations in charge on the reed 12, due to variations in the voltage gradients, are equal and opposite and no net voltage is developed across the resistance 13. Upon the voltage on the lead 5 and, therefore, on the plate 4 rising either above or below the voltage on the plate 2, the voltage gradients between the reed 12 and the plates 2 and 4, respectively, become unbalanced, and the variations of voltage gradients with movement of reed 12 are unequal so that a net change of charge on the reed 12 is developed as the reed vibrates. For purposes of explanation, it is initially assumed that the plate 4 is positive with respect to plate 2 indicating an undesired rise in the output voltage appearing on the lead 37. The voltage gradient between the plates 2 and 4 is in opposite sense to the gradient between the reed 12 and plate 2 and in the same sense as the gradient between the plate 4 and reed 12 and therefore the gradient between reed 12 and the plate 4 is greater than the gradient between the reed 12 and plate 2. The movement of the reed in the larger gradient field subjects the reed to a larger change in voltage than its movement in the smaller gradient field, and a larger change flows in one direction through resistor 13 to compensate for the larger voltage variation than flows in the opposite direction through resistor 13 to compensate for the smaller voltage variation. In consequence, a net A.C. voltage at the frequency of vibration of the reed 12 appears across the resistor 13.

The above phenomenon may also be explained by considering the reed 12 as forming one plate of two distinct capacities existing between reed 12 and plates 2 and 4, respectively. With the voltage on the plates 2 and 4 different, the charge of the two capacities is different. Upon movement of the reed through a short distance, the capacities of the two capacities are changed substantially equally but oppositely. Remembering that $Q = CE$ where Q is the change on the capacitor and C is its capacity and E is the voltage applied thereto, equal changes in capacity produce unequal changes in charge where the voltages across the capacities are different.

The phase of the voltage across the resistor 13 is determined by the polarity of the voltage variation of the plate 4. Thus movement of the reed toward plate 4 when the voltage on this plate is higher than the voltage of plate 2 produces a net flow of charge through resistor 13 of a different direction from the net flow produced by the same movement of the reed when the voltage of plate 4 is lower than the voltage of plate 2. The instantaneous direction of movement of the reed 12 is determined by the instantaneous phase of the voltage across the leads 16 and 17 and therefore the phase of the voltage across resistor 13 with respect to the phase of the voltage in leads 16 and 17 is determined by the relative magnitudes of the voltages on plates 2 and 4.

The A.C. voltage developed across the resistance 13 is amplified by the amplifier 21 and applied to the phase detector 26 through the transformer 24. If the voltage at the upper end of the winding 25 as viewed in FIGURE 1 is in phase with the voltage at the left side of the winding 27 then the rectifier 30 conducts while the rectifier 32 is maintained non-conductive and the capacitor 35 is charged negatively so that a negative voltage is applied to the lead 31 and therefore to the grid 9. The application of a negative voltage to the grid 9 of the tube 8 reduces conduction of the tube and therefore raises the voltage at the lead 37 until the electro-static field across capacitor 3 is reduced to zero. On the other hand if the phase of the voltage output of the amplifier 21 is such that the lower end of the winding 25 is in phase with the voltage at the left side of the winding 27 of the transformer 28 then the diode 32 conducts while the diode 30 does not. A positive charge is established on the capacitor 36 and a positive voltage is applied to the grid 9 of the tube 8 to increase its conduction and lower the voltage on the output lead 37 until the field across capacitor 3 is reduced to zero. Therefore, the latter condition must exist when the voltage on the lead 5 has risen above the voltage on the plate 2 while the former condition exists when the voltage on plate 2 is above the voltage on plate 4.

The system described above is particularly useful in a system employing a nuclear battery since this type of battery provides a very stable voltage so long as a small current drain is imposed thereon. The present invention provides a circuit which imposes a small drain on the standard cell since all that is required of the cell is to provide the small charging current for charging the capacitor 3 when the voltage of plate 4 falls below that of plate 3, the capacitor 3 being charged by the plate voltage source when the voltage of plate 4 rises above that of plate 2. By appropriate design, the response time of the system to a voltage change may be maintained quite small to minimize drain on the cell. It is obvious of course that other standard sources than a nuclear battery may be employed and the system of the present invention is applicable to all standard cells since it is preferable to limit the current drain on all such sources.

Referring now to FIGURE 2 of the accompanying drawings, a nuclear battery 38 has its negative terminal connected to ground and its positive terminal connected to a first plate 39 of a capacitor 40 having a dielectric 41 exhibiting ferro-electric properties. Disposed opposite the plate 39 and on an opposite side of the dielectric body 41 is a capacitor plate 42 connected through a series circuit, comprising a fixed resistor 43 and a variable resistor 44, to an anode 45 of an electron tube 46 having a grid 47 and a cathode 48. The junction of the resistors 43 and 44 is connected through a resistance 49 to a source of anode voltage and the voltage to be controlled appears on a lead 50, connected directly to the anode 45 of the tube 46. The capacitor 40 is povided with third and fourth plates 51 and 52 disposed on opposite sides of the capacitor 40 and along sides of the capacitors which are perpendicular to the sides of the dielectric body 41 which cooperate with the plates 39 and 40. The plate 52 is connected directly to one side of an alternating voltage source 53 while the plate 51 is connected to the other terminal of the source 53 through a diode 54. The series circuit of the source 53 and diode 54 is shunted by the resistive element 55 of a potentiometer 56 having a grounded variable tap 57.

The plate 42 of the capacitor 40 is also connected through series circuit comprising a capacitor 58 and a tuned circuit 59 to ground and the junction of the capacitor 58 and the tuned circuit 59 is connected to the grid 60 of a vacuum tube 61 constituting the first stage of cascaded A.C. error amplifier 62. The error amplifier 62 develops an output voltage across the primary winding 63 of a transformer 64 having a secondary winding 65. The upper end of the winding 65 is connected through a diode 66 to one end of a resistor 67 and the lower end of the winding 65 is connected through a diode 68 to one end of a resistor 69, the other end of which is connected to the other end of the resistor 67. The resistors 67 and 69 are shunted by capacitors 70 and 71, respectively, the junction of the resistor 69, capacitor 71 and diode 68 being connected to ground. The junction of the diode 66 and resistor 67 is connected through a resistor 72 and over a lead 73 to the grid 47 of the tube 46, with the lead 73 being connected to ground through a series circuit comprising the capacitor 74 and a resistor 75.

The elements 65 through 71 constitute a phase sensitive detector having one input voltage applied through the transformer 64 and a second input voltage applied by a secondary winding 76 of a transformer 77 having a primary winding 78 connected across the source of alternating current 53. The secondary winding 76 of transformer 77 has its one end connected to the junction of the resistors 67 and 69 and the other end connected to a center tap 79 on the secondary winding 65 of the transformer 64.

In operation, when the voltages appearing on the plates 39 and 42 of the capacitor 40 are equal, the voltage on the output line 50 is at the desired value and no voltage is developed across the circuit 59, the blocking capacitor 58 preventing the plate voltage from appearing on the grid 60 of tube 61. In consequence, no voltage is applied to the grid 60 and no control voltage is applied to the grid of the tube 47. Upon a variation of the voltage on the plate 42 of the capacitor 40, an electrostatic field is established across the capacitor. The variations in dielectric constant of the capacitor 40, produced by the half wave pulses applied from the generator 53 through the rectifier 54, produce variations in charge across the capacitor 40 in accordance with the equation $Q = \Delta CE$ where Q is the charge on the capacitor, C is its capacity and E is the voltage applied thereacross. Since the dielectric 41 of the capacitor 40 exhibits ferro-electric properties, the capacity of the circuit varies over a predetermined range during each half wave pulse from the source 53 and the charge across the capacitor varies correspondingly. Since the capacitor 40 is connected in series with the nuclear battery 38, the capacitor 58 and the tuned circuit 59, a variation in the charge across the capacitor 40 affects an alternating flow of current in the series circuit. The tuned circuit is employed at the input to the error amplifier 62 to eliminate extraneous frequencies resulting from non-uniformity of the variation of the dielectric 41 with the voltage pulses applied from the oscillator generator 53. Half wave voltage is applied to the dielectric 41 so as to prevent frequency doubling of the signal which must be of the same frequency as the voltage applied to the phase sensitive detector from the source 53.

Returning to the operation of the circuit, upon a deviation of the voltage at the plate 42, current pulses appear across the tuned circuit 59 and are amplified by the error amplifier 62. The output voltage from the error amplifier 62 is applied to the phase sensitive detector via the transformer 64 and depending upon the phase of this voltage with respect to the phase of the voltage appearing across the winding 76, the voltage on the grid 47 of the control tube 46 is raised or lowered so as to lower or raise, respectively, the voltage appearing on the output lead 50. As in the embodiment of FIGURE 1, the relative phases of the voltages appearing on the windings 65 and 76 is determined by whether the voltage on the plate 42 of capacitor 40 is higher or lower than the voltage on the plate 39 of this capacitor. If the voltage on the plate 42 is higher than that on the plate 39 the phases of the voltages must be such that the diode 68 becomes conductive and if the other condition exists; that is, the voltage on plate 42 is lower than on the plate 39, the diode 66 must conduct to lower the voltage on the grid 47 of the tube 46.

In both embodiments of the present invention control is obtained basically by establishing an electrostatic field across a capacitor, the field having a magnitude and sense determined by the difference between the magnitude of the voltages of the two sources, and measuring this voltage gradient to obtain a control voltage which may be employed to reduce the field to zero. In the embodiment of the invention illustrated in FIGURE 1 the voltage gradient is measured by vibrating a conductive reed in the electrostatic field through a fixed distance so that the variation of voltage on the reed over its maximum excursion is proportional to the voltage gradient. In the second embodiment of the invention illustrated in FIGURE 2 of the accompanying drawings, the voltage gradient is measured by varying the dielectric constant of the capacitor dielectric and, therefore, producing a change in charge which is proportional to the voltage gradient across the capacitor. In both embodiments, it is seen that the apparatus provides an excellent voltage control system for use with the nuclear battery since the only drain on the battery results from the variation in charge across the measuring capacities. When the voltage is at the desired value there is no drain at all upon the nuclear battery, even though the battery is connected in the circuit. Upon a deviation of the desired output voltage a small current drain is imposed on the battery, but since correction is effected substantially instantaneously, the total period over which this drain occurs is small and since the magnitude of the current flow due to changing charge is also small, the total drain on the battery is negligible.

While I have described and illustrated two specific embodiments of my invention, it will be clear that variations of the details of construction which are specifically illustrated and described may be resorted to without departing from the true spirit and scope of the invention as defined in the appended claims.

What I claim is:

1. A voltage control circuit comprising a source of standard voltage, a variable source of voltage to be controlled, a capacitor, means for establishing across said capacitor a voltage gradient having a magnitude and algebraic sign determined by the relative magnitudes of said voltage sources, means for periodically varying the capacity of said capacitor to vary periodically the charge thereacross, means for converting the periodically varying charge across said capacitor into a direct electric quantity having a magnitude and polarity determined by the magnitude and sign respectively, of the voltage gradient across said capacitor and means responsive to the direct electric quantity for varying said variable voltage source so as to reduce the direct electric quantity.

2. A voltage control apparatus comprising a source of standard voltage, a source of variable voltage to be controlled, a variable electrical reactance, means for establishing a periodically varying voltage gradient across said reactance having a magnitude and algebraic sign determined by the relative magnitudes of the voltages of said sources, means, including means for periodically varying the value of said reactance, for producing a control voltage determined by the magnitude and polarity of the voltage gradient and means responsive to the control voltage for tending to reduce said voltage gradient to zero.

3. A voltage control apparatus comprising a source of standard voltage, a source of voltage to be controlled, means establishing an electrostatic field having a magnitude and algebraic sign determined by the relative magnitudes of the voltages of said sources, a vibratile conductive member disposed in the electrostatic field, means for periodically vibrating said member transverse to the equipotential lines of the electrostatic field, means for producing a control voltage determined by the variation in charge of said vibratile member and means responsive to said control voltage for varying the voltage of said variable source to reduce the control voltage to zero.

4. A voltage control apparatus comprising a standard source of voltage, a source of voltage to be controlled, a pair of spaced members, means for establishing an electrostatic field between said members having a magnitude determined by the relative magnitudes of the voltages of said sources, a vibratile member disposed between said spaced members, means for periodically vibrating said vibratile member transverse to the equi-potential lines of the electrostatic field, means for producing a control potential proportional to transient variations of charge on said vibratile member, and means responsive to said control potential to vary said variable source to reduce the electrostatic field to zero.

5. A voltage control apparatus comprising a standard source of voltage, a variable source of voltage to be controlled, a capacitor having a dielectric material exhibiting ferro-electric characteristics, means establishing a voltage across said capacitor proportional to the relative magnitudes of the voltages of said sources, means for periodically cycling said dielectric material through its characteristic dielectric constant Vs. voltage curve, means for generating a control voltage determined by the charge variation across said capacitor and means responsive to said control voltage for varying the voltage of said variable source to tend to reduce the voltage across said capacitor to zero.

6. A voltage control apparatus comprising a standard source of voltage, a variable source of voltage to be controlled, a capacitor having a dielectric material exhibiting ferro-electric characteristics, means establishing a voltage across said capacitor proportional to the relative magnitudes of the voltages of said sources, means for periodically cycling said dielectric material through its characteristic dielectric constant Vs. voltage curve, means for generating a voltage for controlling said variable source determined by the charge variation across said capacitor.

7. A voltage measuring apparatus comprising a capacitor having two pair of mutually perpendicular plates and a dielectric material exhibiting ferro-electric properties, means for applying a periodically varying voltage across one of said pairs of plates, means for applying a standard voltage to one of the plates of said other of said pairs of plates, means for applying a voltage to be measured to the other of the plates of said other of said pair of plates and means for measuring the amplitude and phase of the resulting alternating voltage across said other of said pair of plates.

8. Voltage regulating apparatus comprising a standard source of voltage, a variable source of voltage, a circuit for controlling said variable source of voltage, a capacitor having two pairs of plates and a dielectric material exhibiting ferro-electric characteristics, said pairs of plates being disposed at right angles to each other on said material, means for applying a periodic half wave voltage across one of said pairs of plates, means for applying said standard and variable sources of voltage across the other of said pairs of plates, means for coupling the alternating signal generated across said the other of said pairs of plates to said circuit, said circuit including means for detecting the phase of the alternating signal.

References Cited in the file of this patent

UNITED STATES PATENTS

| | | |
|---|---|---|
| 1,862,595 | Holden | June 14, 1932 |
| 1,919,215 | Gunn | July 25, 1933 |
| 2,372,062 | Dorsman | Mar. 20, 1945 |
| 2,470,893 | Hepp | May 24, 1949 |
| 2,536,245 | Wills | Jan. 2, 1951 |

FOREIGN PATENTS

| | | |
|---|---|---|
| 603,327 | Great Britain | June 14, 1948 |